United States Patent
Xia et al.

(10) Patent No.: US 10,074,856 B2
(45) Date of Patent: Sep. 11, 2018

(54) LITHIUM-RICH MANGANESE-BASED POSITIVE ELECTRODE MATERIAL AND PREPARATION METHOD THEREFOR

(71) Applicant: NINGBO INSTITUTE OF MATERIALS TECHNOLOGY AND ENGINEERING, CHINESE ACADEMY OF SCIENCES, Ningbo, Zhejiang (CN)

(72) Inventors: Yonggao Xia, Zhejiang (CN); Bao Qiu, Zhejiang (CN); Zhaoping Liu, Zhejiang (CN)

(73) Assignee: NINGBO INSTITUTE OF MATERIALS TECHNOLOGY AND ENGINEEERING, CHINESE ACADEMY OF SCIENCES, Ningbo, Zhejiang (CN)

( * ) Notice: Subject to any disclaimer, the term of this patent is extended or adjusted under 35 U.S.C. 154(b) by 60 days.

(21) Appl. No.: 15/021,172

(22) PCT Filed: Dec. 5, 2013

(86) PCT No.: PCT/CN2013/088597
§ 371 (c)(1),
(2) Date: Mar. 10, 2016

(87) PCT Pub. No.: WO2015/035712
PCT Pub. Date: Mar. 19, 2015

(65) Prior Publication Data
US 2016/0226068 A1   Aug. 4, 2016

(30) Foreign Application Priority Data
Sep. 12, 2013 (CN) .......................... 2013 1 0416745

(51) Int. Cl.
*H01B 1/08* (2006.01)
*H01M 4/505* (2010.01)
(Continued)

(52) U.S. Cl.
CPC ........ *H01M 4/505* (2013.01); *C01G 45/1257* (2013.01); *C01G 53/50* (2013.01);
(Continued)

(58) Field of Classification Search
CPC . C01G 45/1257; C01G 53/50; C01P 2002/72; C01P 2002/74; C01P 2004/04;
(Continued)

(56) References Cited

U.S. PATENT DOCUMENTS

2006/0051671 A1* 3/2006 Thackeray ......... C01G 45/1221
  429/224
2006/0099508 A1 5/2006 Thackeray et al.
(Continued)

FOREIGN PATENT DOCUMENTS

CN     101378117 A    3/2009
CN     101562245 A    10/2009
(Continued)

OTHER PUBLICATIONS

International Search Report corresponding to Application No. PCT/CN2013/088597; dated Jun. 10, 2014, with English translation.
(Continued)

*Primary Examiner* — Mark T Kopec
*Assistant Examiner* — Jaison P Thomas
(74) *Attorney, Agent, or Firm* — Cantor Colburn LLP (57) ABSTRACT

A lithium-rich manganese-based positive electrode material represented by formula (I). In an X-ray diffraction pattern of the lithium-rich manganese-based positive electrode material, a ratio of a diffraction peak intensity of a Bragg angle near 18.7° to a diffraction peak intensity of a Bragg angle (Continued)

near 44.6° is 1.10 to 1.24. A method for preparing the lithium-rich manganese-based positive electrode material comprises: mixing a lithium-rich manganese-based compound with a lithium remover; and under the effect of the lithium remover, removing part of $Li_2O$ from $Li_2MnO_3$ in the lithium-rich manganese-based compound, so as to obtain the lithium-rich manganese-based positive electrode material. Due to the reduction of the irreversible product $Li_2O$, the initial coulombic efficiency is improved; because of existence of lithium vacancy and oxygen vacancy, the lithium-rich manganese-based positive electrode material has good rate performance and cycle performance.

$$(x-y)Li_2MnO_3 \cdot yMnO_2 \cdot (1-x)Li(M_aM'_b)O_2 \qquad (I)$$

6 Claims, 3 Drawing Sheets (51) Int. Cl.

| | | |
|---|---|---|
| C01G 53/00 | (2006.01) | |
| C01G 45/12 | (2006.01) | |
| H01M 4/525 | (2010.01) | |
| H01M 4/02 | (2006.01) | |
| H01M 10/0525 | (2010.01) | |

(52) U.S. Cl.
CPC .............. H01B 1/08 (2013.01); H01M 4/525 (2013.01); *C01P 2002/72* (2013.01); *C01P 2002/74* (2013.01); *C01P 2004/04* (2013.01); *C01P 2006/40* (2013.01); H01M 10/0525 (2013.01); *H01M 2004/028* (2013.01)

(58) Field of Classification Search
CPC ........... C01P 2006/40; H01M 10/0525; H01M 2004/028; H01M 4/505; H01M 4/525; H01B 1/08
See application file for complete search history.

(56) References Cited

U.S. PATENT DOCUMENTS

| | | | | |
|---|---|---|---|---|
| 2009/0081529 | A1* | 3/2009 | Thackeray | ............ H01M 4/131 429/52 |
| 2009/0123842 | A1* | 5/2009 | Thackeray | ......... C01G 45/1221 429/224 |
| 2010/0227220 | A1* | 9/2010 | Thackeray | ............ H01M 4/131 429/221 |

FOREIGN PATENT DOCUMENTS

| | | | | |
|---|---|---|---|---|
| CN | 102055012 | A | | 5/2011 |
| CN | 102169979 | A | * | 8/2011 |
| CN | 102169979 | A | | 8/2011 |
| CN | 102244237 | A | | 11/2011 |
| CN | 102694164 | A | | 9/2012 |
| CN | 102738458 | A | | 10/2012 |
| JP | 2000223122 | A | | 8/2000 |

OTHER PUBLICATIONS

S.-H. Kang et al., "The Effects of Acid Treatment on the Electrochemical Properties of 0.5 Li2MnO3-0.5LiNi0.44Co0.25Mn0.3O2 Electrodes in Lithium Cells", Journal of the Electrochemical Society, 153 (6) A1186-A1192 (2006).

Written Opinion of the International Searching Authority corresponding to Application No. PCT/CN2013/088597; dated Jun. 10, 2014.

C. Johnson et al., "Synthesis, Characterization and Electrochemistry of Lithium Battery Electrodes: xLi2MnO3• (1-x) LiMn0.333Ni0.333Co0.333O2," Chem. Mater, Jul. 18, 2008, 20, pp. 6095-6106.

KIPO Notification of Reason for Refusal corresponding to Application No. 10-2016-7009242; dated May 22, 2017.

Chinese First Office Action corresponding to Patent No. 201310416745.1; dated Apr. 29, 2016, with English translation.

Du Ke, "Modification of Li[Li0.2Ni0.2Mn0.6]O2 as Cathode Material for Rechargeable Lithium Batteries by Acid-Leaching", Chinese Journal of Inorganic Chemistry, vol. 28 No. 5, May 31, 2012, pp. 983-988.

Du Ke, "Studies on the Effects from Citric Acid and Ammonium Citrate Tribasic Treatment on Electrochemical Performance of Li[Li0.2Mn0.54Ni0.13Co0.13]O2", Chinese Journal of Inorganic Chemistry, vol. 29 No. 4, Apr. 30, 2013, pp. 786-792.

* cited by examiner

LITHIUM-RICH MANGANESE-BASED POSITIVE ELECTRODE MATERIAL AND PREPARATION METHOD THEREFOR

CROSS REFERENCE TO RELATED APPLICATIONS

This is the U.S. national stage of application No. PCT/CN2013/088597, filed on Dec. 5, 2013. Priority under 35 U.S.C. § 119(a) and 35 U.S.C. § 365(b) is claimed from Japanese Application No. 201310416745.1, filed Sep. 12, 2013, the disclosure of which is also incorporated herein by reference.

FIELD OF THE INVENTION

The invention relates to the technical field of a positive electrode material for lithium-ion batteries, especially to a lithium-rich manganese-based positive electrode materials and preparation methods therefor.

BACKGROUND OF THE INVENTION

Currently, lithium cobalt oxide, lithium manganese oxide, nickel-cobalt-manganese ternary material and lithium iron manganese phosphate have been successfully applied to positive electrode materials for lithium-ion batteries, in which lithium cobalt oxide has essentially occupied the market of small-sized lithium-ion batteries, but it cannot serve as positive electrode materials for lithium-ion power batteries due to its high price, low performance and high hidden dangers. Thus, in recent years the other three kinds of materials have attracted much attention as positive electrode materials for lithium-ion power batteries. However, the above three kinds of positive electrode materials have an actual specific capacity generally less than 150 mAh/g. Consequently, to develop lithium-ion power batteries having broad prospects of application, there is an urgent need to develop a novel positive electrode material with a high specific capacity, a low cost and a high safety. Among the novel positive electrode materials that have been developed, lithium-rich manganese-based positive electrode materials with a specific discharge capacity up to 300 mAh/g have received great attention from the researchers.

In terms of current studies, lithium-rich manganese-based positive electrode materials have technical problems such as low initial coulombic efficiency, poor rate performance and poor cycle performance, which hamper its large-scale application. Studies show that the coulombic efficiency of lithium-rich manganese-based positive electrode materials can be effectively improved by surface coating. A method for surface coating a lithium-rich positive electrode material using $MnO_2$ is disclosed, for example, in Chinese Patent Publication No. CN101562245A, which reduces the initial irreversible capacity loss of the material and improves the cycle performance of the material at a high rate, but the modified material still has a relatively low discharge capacity. In Chinese Patent Publication No. CN102738458A, oxides or phosphates of the elements such as Al, Ce, Mn, Ru, Y, Ni, Co and the like are used as a coating layer of a lithium-rich manganese-based positive electrode material, which increases the initial coulombic efficiency and improves cycle performance and rate performance, but this modified method decreases the discharge voltage plateau of the lithium-rich manganese-based positive electrode material, resulting in a decrease in the energy density of the lithium-rich positive electrode material. Chinese Patent Publication No. CN102694164A discloses a lithium-rich manganese-based positive electrode material doped with nitrogen or carbon on the surface, which improves the cycle performance of the lithium-rich manganese-based positive electrode material, but this method does not solve the problem about low initial coulombic efficiency.

Recently, a non-patent literature (J. Electrochem. Soc. 153, A1186-A1192, (2006)) proposes a method for treating a surface of a lithium-rich manganese-based positive electrode material with strong acids, and the results indicate that chemical activation with the strong acid treatment is an effective means for improving the initial efficiency. However, during the process of acid treatment, though lithium vacancies and oxygen vacancies are formed on the particle surface, the surface structure of the material is severely damaged and part of H protons are exchanged with Li ions, thus causing significant decreases in the cycle performance and the rate performance of the material.

SUMMARY OF THE INVENTION

A technical problem solved by the invention is to provide a lithium-rich manganese-based positive electrode material with high initial efficiency, cycle performance and rate performance and a preparation method therefor.

In view of this, the invention provides a lithium-rich manganese-based positive electrode material represented by formula (I), wherein in an X-ray diffraction pattern of the lithium-rich manganese-based positive electrode material, a ratio of a diffraction peak intensity of a Bragg angle near 18.7° to a diffraction peak intensity of a Bragg angle near 44.6° is 1.10 to 1.24;

$$(x-y)Li_2MnO_3 \cdot yMnO_2 \cdot (1-x)Li(M_aM'_b)O_2 \qquad (I);$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$$0 < x \le 0.8;$$

$$0.01 \le y \le 0.2;$$

$$a+b=1; \text{ and}$$

$$0 \le b \le 0.5.$$

The invention also provides a method for preparing the lithium-rich manganese-based positive electrode material, comprising the following steps of:

mixing a lithium-rich manganese-based compound represented by formula (II) with a lithium remover, and carrying out a lithium-removal reaction to obtain the lithium-rich manganese-based positive electrode material represented by formula (I) after the reaction;

$$(x-y)Li_2MnO_3 \cdot yMnO_2 \cdot (1-x)Li(M_aM'_b)O_2 \qquad (I);$$

$$xLi_2MnO_3 \cdot (1-x)Li(M_aM'_b)O_2 \qquad (II);$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$0 < x \leq 0.8$;

$0.01 \leq y \leq 0.2$;

$a+b=1$; and $0 \leq b \leq 0.5$.

Preferably, the lithium remover is a gas lithium remover or a solid lithium remover, in which the gas lithium remover is an acidic gas or an alkaline gas; and the solid lithium remover is one or more substance(s) that may decompose to produce an acidic gas or an alkaline gas.

Preferably, the acidic gas is one or more selected from the group consisting of sulfur dioxide, nitrogen dioxide, carbon dioxide, hydrogen fluoride, halogen gases and hydrogen sulfide.

Preferably, the alkaline gas is ammonia, hydrogen phosphide or hydrazine.

Preferably, the solid lithium remover is one or more selected from the group consisting of ammonium chloride, ammonium sulphite, ammonium carbonate, ammonium bicarbonate, ammonium acetate, ammonium oxalate, ammonium phosphide and urea.

Preferably, the lithium-removal reaction is a solid-phase lithium-removal reaction or a liquid-phase lithium-removal reaction.

Preferably, the solid-phase lithium-removal reaction involves uniformly mixing the solid lithium remover with the lithium-rich manganese-based compound in a molar ratio of 1:100 to 1:2, and then carrying out a reaction at 40 to 1000° C. for 2 to 30 h.

Preferably, the solid-phase lithium-removal reaction involves introducing a mixed gas of a gas lithium remover and an inert gas in a molar ratio of 1:100 to 1:2 into the lithium-rich manganese-based compound, and carrying out a reaction at 40 to 1000° C. for 2 to 30 h.

Preferably, the liquid-phase lithium-removal reaction involves mixing the lithium-rich manganese-based compound and the solid lithium remover with water, and carrying out a reaction at 60 to 300° C. for 2 to 30 h, wherein a molar ratio of the lithium-rich manganese-based compound and the solid lithium remover is 1:100 to 1:2.

Preferably, after the reaction is complete, the products are treated by mixing the products after the reaction with a liquid phase extractant and carrying out a heat treatment after filtration.

The present invention provides a method for preparing a lithium-rich manganese-based positive electrode material, in which part of $Li_2O$ is removed from $Li_2MnO_3$ in the lithium-rich manganese-based compound using a lithium remover by reacting the lithium remover with the lithium-rich manganese-based compound to obtain the lithium-rich manganese-based positive electrode material having lithium vacancies and oxygen vacancies. In the invention, by treating the lithium-rich manganese-based compound with a lithium remover, only $Li_2O$ is removed from the surface while no change occurs in the surface structure thereof. The invention also provides a lithium-rich manganese-based positive electrode material prepared by the above method. Generation of $Li_2O$ is the main reason that causes a low initial coulombic efficiency. Therefore, the initial coulombic efficiency of the lithium-rich manganese-based positive electrode material according to the invention is increased due to the reduction of $Li_2O$; and at the same time, because of the existence of oxygen vacancies and lithium vacancies in the lithium-rich manganese-based positive electrode material according to the invention, lithium ions are easy to diffuse, thus improving the rate performance and the cycle performance.

DETAILED EMBODIMENTS

To further understand the invention, preferred embodiments of the invention are described in combination with examples below. However, it should be understand that these descriptions are given only for further explanations of features and advantages of the invention, rather than limitations to the claims of the invention.

An example according to the invention disclose a lithium-rich manganese-based positive electrode material represented by formula (I), in which in an X-ray diffraction pattern of the lithium-rich manganese-based positive electrode material, a ratio of a diffraction peak intensity of a Bragg angle near 18.7° to a diffraction peak intensity of a Bragg angle near 44.6° is 1.10 to 1.24;

$$(x-y)Li_2MnO_3 \cdot yMnO_2 \cdot (1-x)Li(M_aM'_b)O_2 \qquad (I);$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$0 < x \leq 0.8$;

$0.01 \leq y \leq 0.2$;

$a+b=1$; and $0 \leq b \leq 0.5$.

In the invention, the properties of the lithium-rich manganese-based positive electrode material itself are defined by the ratio of the diffraction peak strengths of the lithium-rich manganese-based positive electrode material. In the invention, the X-ray diffraction of the lithium-rich manganese-based positive electrode material is determined under conditions of: Cu target, tube voltage of 40 V, tube current of 40 mA, scanning speed of 2°/min, 2θ scanning range of 15° to 90°, step of 0.02°, divergence slit (DS) of 1 mm, antiscattering slit (SS) of 8 mm, and graphite monochromator.

When the lithium-rich manganese-based positive electrode material according to the invention is used as a positive electrode material for a lithium-ion battery, for the capacity-voltage differential curve during the initial charge-discharge process of the lithium-ion battery, the first peak is located between 3.0 and 3.4 V. The capacity-voltage differential curve can reflect the discharge plateau potentials of a battery, and the larger the capacity-voltage differential strength within the potentials is, the higher the discharge capacity of the obtained lithium-rich manganese-based positive electrode material is. The capacity-voltage differential curve is obtained in the invention under conditions of a current density of 25 mA/g (0.1 C) and a voltage range of 2 to 4.8V.

The invention also provides a method for preparing the above lithium-rich manganese-based positive electrode material, comprising the following steps of:

mixing a lithium-rich manganese-based compound represented by formula (II) with a lithium remover, and carrying out a lithium-removal reaction to obtain the lithium-rich manganese-based positive electrode material represented by formula (I) after the reaction;

$$(x-y)Li_2MnO_3 \cdot yMnO_2 \cdot (1-x)Li(M_aM'_b)O_2 \quad (I);$$

$$xLi_2MnO_3 \cdot (1-x)Li(M_aM'_b)O_2 \quad (II);$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$0<x\leq0.8$;

$0.01\leq y\leq0.2$;

$a+b=1$; and $0\leq b\leq0.5$.

The invention provides a method for preparing the lithium-rich manganese-based positive electrode material, in which a lithium-rich manganese-based compound is mixed with a lithium remover, part of $Li_2O$ is removed from $Li_2MnO_3$ in the lithium-rich manganese-based compound under the action of the lithium remover to obtain the lithium-rich manganese-based positive electrode material having lithium vacancies and oxygen vacancies, and meanwhile the removed $Li_2O$ is reacted with a gas or a liquid to generate a soluble lithium-containing compound.

According to the invention, during the process of preparing the lithium-rich manganese-based positive electrode material, the lithium-rich manganese-based compound represented by formula (II) is mixed with a lithium remover, and part of $Li_2O$ is removed from $Li_2MnO_3$ in the lithium-rich manganese-based compound under the action of the lithium remover.

In the invention, the lithium remover may be a gas or a solid. If the lithium remover is a gas, the lithium remover is preferably an acidic gas or an alkaline gas, wherein the acidic gas includes, but is not limited to, sulfur dioxide, nitrogen dioxide, carbon dioxide, hydrogen fluoride, halogen gas or hydrogen sulfide, and the alkaline gas is preferably ammonia, hydrogen phosphide or hydrazine. If the lithium remover is a solid, the lithium remover is preferably one or more substance(s) that may decompose to produce an acidic gas or an alkaline gas, and is more preferably one or more selected from the group consisting of ammonium chloride, ammonium sulphite, ammonium carbonate, ammonium bicarbonate, ammonium acetate, ammonium oxalate, ammonium phosphide and urea.

According to the invention, the lithium-removal reaction is preferably a solid-phase lithium-removal reaction or a liquid-phase lithium-removal reaction. The solid-phase lithium-removal reaction may be carried out by, under airtight condition, uniformly mixing the solid lithium remover with the lithium-rich manganese-based compound in a molar ratio of 1:100 to 1:2, and then carrying out a reaction at 40 to 1000° C. for 2 to 30 h. The solid-phase lithium-removal reaction may also be carried out by introducing a mixed gas of a gas lithium remover and an inert gas in a molar ratio of 1:100 to 1:2 into the lithium-rich manganese-based compound, and carrying out a reaction at 40 to 1000° C. for 2 to 30 h. The liquid-phase lithium-removal reaction involves mixing the lithium-rich manganese-based compound and a solid lithium remover with water, and carrying out a reaction at 60 to 300° C. for 2 to 30 h, wherein a molar ratio of the lithium-rich manganese-based compound and the solid lithium remover is 1:100 to 1:2.

As to the preparation of the lithium-rich manganese-based positive electrode material, in the case of using sulfur dioxide as the lithium remover, the process of lithium-removal reaction may be represented by the following reaction equation:

$$xLi_2MnO_3 \cdot (1-x)Li(M_aM'_b)O_2 + ySO_2 = (x-y)Li_2MnO_3 \cdot yMnO_2 \cdot (1-x)Li(M_aM'_b)O_2 + yLi_2SO_3;$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$0<x\leq0.8$; $0.01\leq y\leq0.2$; $a+b=1$; and $0\leq b\leq0.5$.

According to the invention, a soluble lithium compound and a lithium-rich manganese-based positive electrode material having lithium vacancies and oxygen vacancies are obtained after the lithium-rich manganese-based compound is reacted with the lithium remover. In the invention, to enable the lithium compound to be separated effectively from the lithium-rich manganese-based positive electrode material, the products after the reaction with the lithium remover are preferably mixed with a liquid phase extractant to dissolve the lithium compound precipitated out of the material surface, the soluble lithium compound is removed after filtration, and then a second heat treatment is performed which has an effect of removing the extractant from the particle surface, thus obtaining the lithium-rich manganese-based positive electrode material with excellent performance. The temperature of the second heat treatment is preferably 120 to 500° C., and more preferably 180 to 350° C.

The present invention provides a method for preparing a lithium-rich manganese-based positive electrode material, in which $Li_2O$ is removed from $Li_2MnO_3$ by reacting a lithium remover with a lithium-rich manganese-based compound to obtain the lithium-rich manganese-based positive electrode material having lithium vacancies and oxygen vacancies. In the invention, by treating the lithium-rich manganese-based compound with a lithium remover, only $Li_2O$ is removed from the surface while no change occurs in the surface structure thereof. The invention also provides a lithium-rich manganese-based positive electrode material prepared by the above method. Existing theories suggest that when a lithium-rich manganese-based positive electrode material is being charged, $Li_2MnO_3$ will be activated to generate $Li_2O$ and $MnO_2$, and generation of $Li_2O$ is the main reason that causes a low initial coulombic efficiency. Therefore, the initial coulombic efficiency of the lithium-rich manganese-based positive electrode material according to the invention is increased due to the reduction of $Li_2O$; and at the same time, because of the existence of oxygen vacancies and lithium vacancies in the lithium-rich manganese-based positive electrode material according to the invention, lithium ions are easy to diffuse, thus improving the rate performance and the cycle performance. The experimental results indicate that the lithium-rich manganese-based positive electrode material provided according to the invention has an initial efficiency greater than 93% or more and a specific discharge capacity at a rate of 1 C of 260 mAh/g at room temperature, and there is no obvious decline in cycle performance after 100 cycles at normal temperature.

To further understand the invention, the lithium-rich manganese-based positive electrode material provided according to the invention and the preparation method therefor are described in detail in combination with examples below, and the protection scope of the invention is not limited by the following examples.

Example 1

1) Manganese sulfate, cobalt sulfate, nickel sulfate and sodium hydroxide were mixed in a molar ratio of manganese element, cobalt element, nickel element and sodium element of 1:0.25:0.25:3, blended and stirred for 5 h, and the precipitate was dried to obtain a precursor $MnCo_{0.25}Ni_{0.25}(OH)_{2.5}$.

2) The precursor $MnCo_{0.25}Ni_{0.25}(OH)_{2.5}$ obtained in step 1) and lithium hydroxide in a molar ratio of 1:1.5 were heat treated at a temperature of 850° C. for 24 h, and after cooling and grinding a conventional lithium-rich manganese-based positive electrode material $0.5Li_2MnO_3.0.5LiCo_{1/3}Mn_{1/3}Ni_{1/3}O_2$ was obtained.

Example 2

1) 1 mol of $0.5Li_2MnO_3.0.5LiCo_{1/3}Mn_{1/3}Ni_{1/3}O_2$ synthesized in Example 1 was put into a reactor into which 0.01 mol of $SO_2$ gas was introduced, and after being sealed the reactor was heated to 120° C. for heat treatment of 16 h.

2) The materials obtained in step 1) were washed with distilled water, which was repeated 3 times, and after filtration the materials were heated to 120° C. for heat treatment of 16 h to obtain the lithium-rich manganese-based positive electrode material with lithium vacancies of $0.49Li_2MnO_3.0.5LiCo_{1/3}Mn_{1/3}Ni_{1/3}O_2.0.01MnO_2$ described in the invention.

Example 3

1) 1 mol of $0.5Li_2MnO_3.0.5LiCo_{1/3}Mn_{1/3}Ni_{1/3}O_2$ synthesized in Example 1 was put into a reactor into which 0.05 mol of $SO_2$ gas was introduced, and after being sealed the reactor was heated to 120° C. for heat treatment of 16 h.

2) The materials obtained in step 1) were washed with distilled water, which was repeated 3 times, and after filtration the materials were heated to 120° C. for heat treatment of 16 h to obtain the lithium-rich manganese-based positive electrode material with lithium vacancies of $0.45Li_2MnO_3.0.5LiCo_{1/3}Mn_{1/3}Ni_{1/3}O_2.0.05MnO_2$ described in the invention.

Example 4

1) 1 mol of $0.5Li_2MnO_3.0.5LiCo_{1/3}Mn_{1/3}Ni_{1/3}O_2$ synthesized in Example 1 was put into a reactor into which 0.1 mol of $SO_2$ gas was introduced, and after being sealed the reactor was heated to 120° C. for heat treatment of 16 h.

2) The materials obtained in step 1) were washed with distilled water, which was repeated 3 times, and after filtration the materials were heated to 120° C. for heat treatment of 16 h to obtain the lithium-rich manganese-based positive electrode material with lithium vacancies of $0.4Li_2MnO_3.0.5LiCo_{1/3}Mn_{1/3}Ni_{1/3}O_2.0.1MnO_2$ described in the invention.

Example 5

1) 1 mol of $0.5Li_2MnO_3.0.5LiCo_{1/3}Mn_{1/3}Ni_{1/3}O_2$ synthesized in Example 1 was put into a reactor into which 0.2 mol of $SO_2$ gas was introduced, and after being sealed the reactor was heated to 120° C. for heat treatment of 16 h.

2) The materials obtained in step 1) were washed with distilled water, which was repeated 3 times, and after filtration the materials were heated to 120° C. for heat treatment of 16 h to obtain the lithium-rich manganese-based positive electrode material with lithium vacancies of $0.3Li_2MnO_3.0.5LiCo_{1/3}Mn_{1/3}Ni_{1/3}O_2.0.2MnO_2$ described in the invention.

Example 6

1) 1 mol of $0.5Li_2MnO_3.0.5LiCo_{1/3}Mn_{1/3}Ni_{1/3}O_2$ synthesized in Example 1 was put into a reactor into which 0.5 mol of $SO_2$ gas was introduced, and after being sealed the reactor was heated to 120° C. for heat treatment of 16 h.

2) The materials obtained in step 1) were washed with distilled water, which was repeated 3 times, and after filtration the materials were heated to 120° C. for heat treatment of 16 h to obtain the lithium-rich manganese-based positive electrode material with lithium vacancies of $0.5LiCo_{1/3}Mn_{1/3}Ni_{1/3}O_2.0.5MnO_2$ described in the invention.

Example 7

Figure 1:
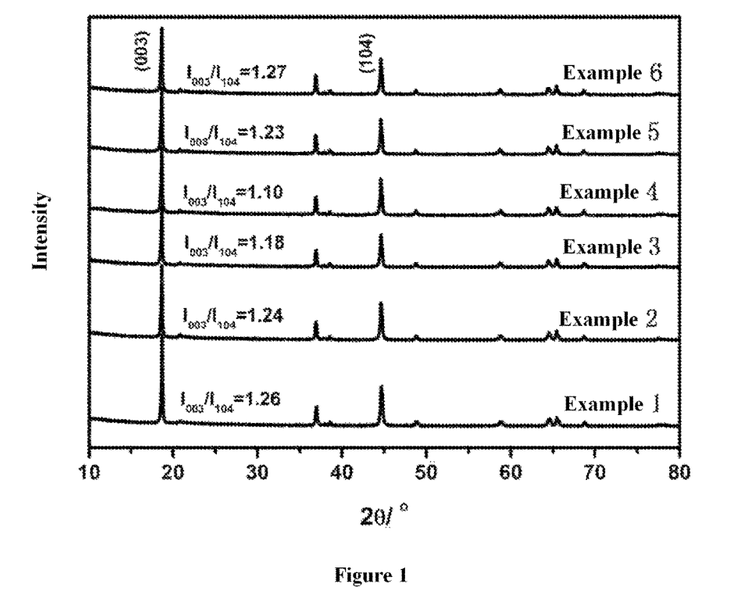
FIG. 1 is an X-ray diffraction pattern of the lithium-rich manganese-based positive electrode material according to Examples 1 to 6.

The lithium-rich manganese-based positive electrode materials obtained in Examples 1 to 5 were analyzed with X-ray diffraction using an X-ray diffractometer (Bruker Corp., German). The determination conditions included: Cu—Kα ray as the light source, Cu target, tube voltage: 40V, tube current: 40 mA, scanning speed: 2°/min, 2θ scan range: 15° to 90°, step: 0.02°, divergence slit (DS): 1 mm, anti-scattering slit (SS): 8 mm, and graphite monochromator. The X-ray diffraction patterns of the lithium-rich manganese-based positive electrode materials of Examples 1-5 are shown in FIG. 1.

Half cell test: 1) 8 g of each of the lithium-rich manganese-based positive electrode materials with lithium vacancies and oxygen vacancies obtained in Examples 1 to 5, 1 g of acetylene black, 1 g of polyvinylidene fluoride and 30 g of N-methyl pyrrolidone were mixed at normal temperature under normal pressure to form a slurry, which was coated uniformly on a surface of an aluminum foil to prepare an electrode plate; the obtained electrode plate was compressed tightly after being dried at 80° C., and cut into a circular sheet having an area of 1.32 $cm^2$ to serve as a positive electrode; and then with a metallic lithium plate serving as a negative electrode and a 1 mol/L solution of $LiPF_6$ in ethylene carbonate (EC) and dimethyl carbonate (DMC) at a volume ratio of EC to DMC being 1:1 serving as electrolyte, a button cell was assembled in a glovebox filled with argon gas.

Figure 2:
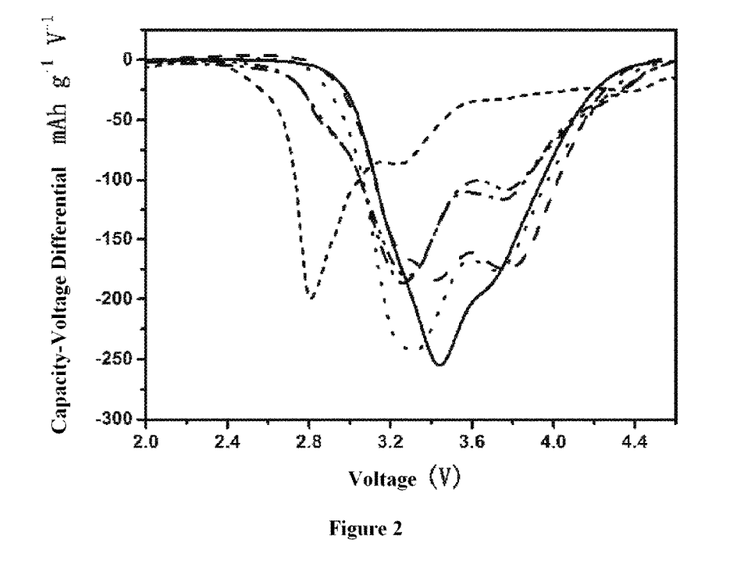
FIG. 2 shows capacity-voltage differential curves during the initial charge-discharge process of the lithium-rich manganese-based positive electrode material prepared in Examples 1 to 6.

The obtained half cells were tested for cycle performance using an electrochemical tester at a temperature of 25° C. with a charge-discharge current of 0.1 to 3 C, a charge cut-off voltage of 4.8V and a discharge cut-off voltage of 2.0V. The capacity-voltage differential curves are shown in FIG. 2, in which curve —— is the capacity-voltage differential curve of the lithium-rich manganese-based positive electrode material prepared in Example 1, curve − − is the capacity-voltage differential curve of the lithium-rich manganese-based positive electrode material prepared in Example 2, curve · · · is the capacity-voltage differential curve of the lithium-rich manganese-based positive electrode material prepared in Example 3, curve —·— is the capacity-voltage differential curve of the lithium-rich manganese-based positive electrode material prepared in Example 4, curve —··· is the capacity-voltage differential curve of the lithium-rich manganese-based positive electrode material prepared in Example 5, and curve − − − − is the capacity-voltage differential curve of the lithium-rich manganese-based positive electrode material prepared in Example 6. As can be seen from the figure, the first reductive peaks of the lithium-rich manganese-based positive electrode materials with lithium vacancies and oxygen vacancies are located between 3.2 and 3.4 V. The electrochemical performance and XRD data of the lithium-rich manganese-based positive electrode materials of Examples 1 to 6 are shown in Table 1.

electrode material with lithium vacancies of $0.45Li_2MnO_3 \cdot 0.5LiCo_{1/3}Mn_{1/3}Ni_{1/3}O_2 \cdot 0.05MnO_2$ described in the invention.

Example 10

1) 1 mol of $0.5Li_2MnO_3 \cdot 0.5LiCo_{1/3}Mn_{1/3}Ni_{1/3}O_2$ was put into a reactor into which 0.1 mol of $Cl_2$ gas was introduced, and after being sealed the reactor was heated to 180° C. for heat treatment of 8 h.

2) The material obtained in step 1) were washed with distilled water, which was repeated 3 times, and after filtration they were heated to 300° C. for heat treatment of 6 h to obtain the lithium-rich manganese-based positive electrode material with lithium vacancies of $0.4Li_2MnO_3 \cdot 0.5LiCo_{1/3}Mn_{1/3}Ni_{1/3}O_2 \cdot 0.1MnO_2$ described in the invention.

Example 11

1) 1 mol of $0.5Li_2MnO_3 \cdot 0.5LiCo_{1/3}Mn_{1/3}Ni_{1/3}O_2$ was put into a reactor into which 0.2 mol of HCl gas was introduced, and after being sealed the reactor was heated to 150° C. for heat treatment of 5 h.

2) The materials obtained in step 1) were washed with distilled water, which was repeated 3 times, and after filtration they were heated to 200° C. for heat treatment of

TABLE 1

Data Sheet of Physical and Chemical Indexes and Electrochemical Performances of Examples 1 to 6

| Group | Amount of Lithium Remover (mol) | $I_{(003)}/I_{(104)}$ | Initial Coulombic Efficiency (%) | Specific Discharge Capacity at 0.1 C (mAh/g) | Initial Specific Discharge Capacity at 1 C (mAh/g) | Retention after 100 Cycle (%) |
|---|---|---|---|---|---|---|
| Example 1 | 0 | 1.26 | 83 | 280 | 223 | 90 |
| Example 2 | 0.01 | 1.24 | 88 | 292 | 255 | 91 |
| Example 3 | 0.05 | 1.18 | 90 | 296 | 260 | 92 |
| Example 4 | 0.1 | 1.10 | 93 | 305 | 267 | 95 |
| Example 5 | 0.2 | 1.23 | 96 | 290 | 231 | 88 |
| Example 6 | 0.5 | 1.27 | 95 | 275 | 221 | 91 |

Example 8

1) 1 mol of $0.5Li_2MnO_3 \cdot 0.5LiCo_{1/3}Mn_{1/3}Ni_{1/3}O_2$ was put into a reactor into which 0.01 mol of $NO_2$ gas was introduced, and after being sealed the reactor was heated to 120° C. for heat treatment of 16 h.

2) The material obtained in step 1) were washed with distilled water, which was repeated 3 times, and after filtration they were heated to 300° C. for heat treatment of 6 h to obtain the lithium-rich manganese-based positive electrode material with lithium vacancies of $0.49Li_2MnO_3 \cdot 0.5LiCo_{1/3}Mn_{1/3}Ni_{1/3}O_2 \cdot 0.01MnO_2$ described in the invention.

Example 9

1) 1 mol of $0.5Li_2MnO_3 \cdot 0.5LiCo_{1/3}Mn_{1/3}Ni_{1/3}O_2$ was put into a reactor into which 0.05 mol of $CO_2$ gas was introduced, and after being sealed the reactor was heated to 120° C. for heat treatment of 16 h.

2) The materials obtained in step 1) were washed with distilled water, which was repeated 3 times, and after filtration they were heated to 400° C. for heat treatment of 6 h to obtain the lithium-rich manganese-based positive 6 h to obtain the lithium-rich manganese-based positive electrode material with lithium vacancies of $0.4Li_2MnO_3 \cdot 0.5LiCo_{1/3}Mn_{1/3}Ni_{1/3}O_2 \cdot 0.1MnO_2$ described in the invention.

Example 12

1) 1 mol of $0.5Li_2MnO_3 \cdot 0.5LiCo_{1/3}Mn_{1/3}Ni_{1/3}O_2$ was put into a reactor into which 0.5 mol of $H_2S$ gas was introduced, and after being sealed the reactor was heated to 220° C. for heat treatment of 10 h.

2) The materials obtained in step 1) were washed with distilled water, which was repeated 3 times, and after filtration they were heated to 400° C. for heat treatment of 6 h to obtain the lithium-rich manganese-based positive electrode material with lithium vacancies of $0.5LiCo_{1/3}Mn_{1/3}Ni_{1/3}O_2 \cdot 0.5MnO_2$ described in the invention.

Example 13

1) 1 mol of $0.6Li_2MnO_3 \cdot 0.4LiCo_{0.2}Mn_{0.3}Ni_{0.5}O_2$ was put into an upper layer of a reactor, and 0.01 mol of ammonium carbonate was put into the reactor prior to being sealed. Then, the reactor was heated to 160° C. for heat treatment of 12 h.

2) The materials obtained in step 1) were washed with distilled water, which was repeated 3 times, and after filtration they were heated to 350° C. for heat treatment of 8 h to obtain the lithium-rich manganese-based positive electrode material with lithium vacancies of $0.59Li_2MnO_3 \cdot 0.4LiCo_{0.2}Mn_{0.3}Ni_{0.5}O_2 \cdot 0.01MnO_2$ described in the invention.

Example 14

1) 1 mol of $0.6Li_2MnO_3 \cdot 0.4LiCo_{0.2}Mn_{0.3}Ni_{0.5}O_2$ was put into an upper layer of a reactor, and 0.05 mol of ammonium bicarbonate was put into the reactor prior to being sealed. Then, the reactor was heated to 180° C. for heat treatment of 20 h.

2) The materials obtained in step 1) were washed with distilled water, which was repeated 3 times, and after filtration they were heated to 400° C. for heat treatment of 8 h to obtain the lithium-rich manganese-based positive electrode material with lithium vacancies of $0.55Li_2MnO_3 \cdot 0.4LiCo_{0.2}Mn_{0.3}Ni_{0.5}O_2 \cdot 0.05MnO_2$ described in the invention.

Example 15

1) 1 mol of $0.4Li_2MnO_3 \cdot 0.6LiCo_{1/3}Mn_{1/5}Ni_{7/15}O_2$ was put into an upper layer of a reactor, and 0.1 mol of ammonium chloride was put into the reactor prior to being sealed. Then, the reactor was heated to 200° C. for heat treatment of 10 h.

Figure 3:
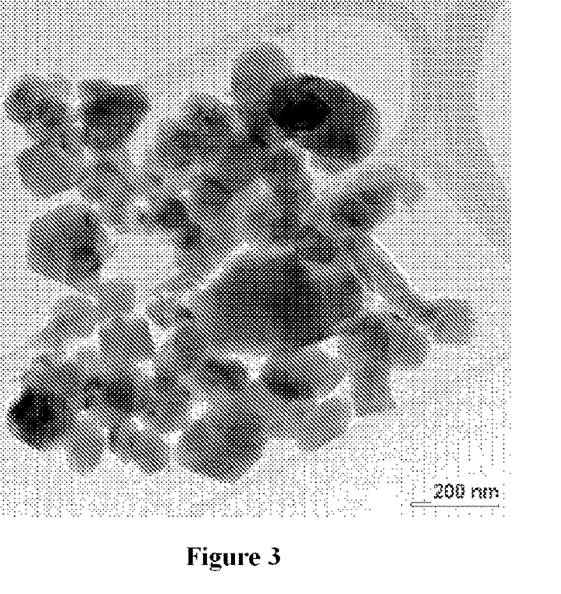
FIG. 3 shows a transmission electron microscopic image of the lithium-rich manganese-based positive electrode material prepared in Example 15.

2) The materials obtained in step 1) were washed with distilled water, which was repeated 3 times, and after filtration they were heated to 350° C. for heat treatment of 8 h to obtain the lithium-rich manganese-based positive electrode material with lithium vacancies of $0.3Li_2MnO_3 \cdot 0.6LiCo_{1/3}Mn_{1/5}Ni_{7/15}O_2 \cdot 0.1MnO_2$ described in the invention. As shown in FIG. 3, FIG. 3 is a transmission electron microscopic image of the lithium-rich manganese-based positive electrode material prepared in Example 15.

Example 16

1) 1 mol of $0.4Li_2MnO_3 \cdot 0.6LiCo_{1/3}Mn_{1/5}Ni_{7/15}O_2$ was put into an upper layer of a reactor, and 0.2 mol of ammonium sulfite was put into a lower layer of the reactor. After being sealed, the reactor was heated to 200° C. for heat treatment of 10 h.

2) The materials obtained in step 1) were washed with distilled water, which was repeated 3 times, and after filtration they were heated to 350° C. for heat treatment of 8 h to obtain the lithium-rich manganese-based positive electrode material with lithium vacancies of $0.3Li_2MnO_3 \cdot 0.6LiCo_{1/3}Mn_{1/5}Ni_{7/15}O_2 \cdot 0.1MnO_2$ described in the invention.

Example 17

1) 1 mol of $0.5Li_2MnO_3 \cdot 0.5LiCo_{1/3}Mn_{1/3}Ni_{1/3}O_2$ was put into an upper layer of a reactor, and 0.3 mol of ammonium phosphide was put into the reactor prior to being sealed. Then, the reactor was heated to 250° C. for heat treatment of 18 h.

2) The materials obtained in step 1) were washed with distilled water, which was repeated 3 times, and after filtration they were heated to 350° C. for heat treatment of 8 h to obtain the lithium-rich manganese-based positive electrode material with lithium vacancies of $0.2Li_2MnO_3 \cdot 0.5LiCo_{1/3}Mn_{1/5}Ni_{7/15}O_2 \cdot 0.3MnO_2$ described in the invention.

Example 18

1) 1 mol of $0.4Li_2MnO_3 \cdot 0.6LiCo_{1/3}Mn_{1/5}Ni_{7/15}O_2$ was put into an upper layer of a reactor, and 0.5 mol of urea was put into a lower layer of the reactor. After being sealed, the reactor was heated to 200° C. for heat treatment of 10 h.

2) The materials obtained in step 1) were washed with distilled water, which was repeated 3 times, and after filtration they were heated to 350° C. for heat treatment of 8 h to obtain the lithium-rich manganese-based positive electrode material with lithium vacancies of $0.6LiCo_{1/3}Mn_{1/5}Ni_{7/15}O_2 \cdot 0.4MnO_2$ described in the invention.

Example 19

1) 1 mol of $0.8Li_2MnO_3 \cdot 0.2LiCo_{0.95}Fe_{0.04}Nb_{0.01}O_2$, 0.01 mol of ammonium oxalate and 4 mol of $H_2O$ were mixed uniformly, and heated to 500° C. for heat treatment of 10 h.

2) The materials obtained in step 1) were mixed with 2 mol of ethanol uniformly, and after filtration they were heated to 150° C. for heat treatment of 3 h to obtain the lithium-rich manganese-based positive electrode material with lithium vacancies of $0.79Li_2MnO_3 \cdot 0.2LiCo_{0.95}Fe_{0.04}Nb_{0.01}O_2 \cdot 0.01MnO_2$ described in the invention.

Example 20

1) 1 mol of $0.8Li_2MnO_3 \cdot 0.2LiCo_{0.95}Fe_{0.04}Nb_{0.01}O_2$, 0.02 mol of ammonium acetate and 5 mol of $H_2O$ were mixed uniformly, and heated to 400° C. for heat treatment of 20 h.

2) The materials obtained in step 1) were mixed with 20 mol of ethanol uniformly, and after filtration they were heated to 150° C. for heat treatment of 3 h to obtain the lithium-rich manganese-based positive electrode material with lithium vacancies of $0.78Li_2MnO_3 \cdot 0.2LiCo_{0.95}Fe_{0.04}Nb_{0.01}O_2 \cdot 0.02MnO_2$ described in the invention.

Example 21

1) 1 mol of $0.5Li_2MnO_3 \cdot 0.5LiCo_{0.33}Mn_{0.34}Ni_{0.3}B_{0.03}O_2$, 0.06 mol of ammonium fluoride and 6 mol of $H_2O$ were mixed uniformly, and heated to 180° C. for heat treatment of 16 h.

2) The materials obtained in step 1) were mixed with 2 mol of $H_2O$ uniformly, and after filtration they were heated to 250° C. for heat treatment of 36 h to obtain the lithium-rich manganese-based positive electrode material with lithium vacancies of $0.47Li_2MnO_3 \cdot 0.5LiCo_{0.33}Mn_{0.34}Ni_{0.3}B_{0.03}O_2 \cdot 0.03MnO_2$ described in the invention.

Example 22

1) 1 mol of $0.4Li_2MnO_3 \cdot 0.6LiCo_{1/3}Mn_{1/5}Ni_{7/15}O_2$, 0.1 mol of urea and 10 mol of $H_2O$ were mixed uniformly, and heated to 250° C. for heat treatment of 10 h.

2) The materials obtained in step 1) were mixed with 2 mol of $H_2O$ uniformly, and after filtration they were heated to 250° C. for heat treatment of 36 h to obtain the lithium-rich manganese-based positive electrode material with lithium vacancies of $0.3Li_2MnO_3 \cdot 0.6LiCo_{1/3}Mn_{1/5}Ni_{7/15}O_2 \cdot 0.1MnO_2$ described in the invention.

Example 23

1) 1 mol of $0.8Li_2MnO_3 \cdot 0.2LiCo_{0.95}Fe_{0.04}Nb_{0.01}O_2$, 0.5 mol of ammonium carbonate and 3 mol of $H_2O$ were mixed uniformly, and heated to 300° C. for heat treatment of 20 h.

2) The materials obtained in step 1) were mixed with 20 mol of ethanol uniformly, and after filtration they were heated to 180° C. for heat treatment of 3 h to obtain the lithium-rich manganese-based positive electrode material with lithium vacancies of $0.3Li_2MnO_3 \cdot 0.2LiCo_{0.95}Fe_{0.04}Nb_{0.01}O_2 \cdot 0.5MnO_2$ described in the invention.

Figure 4:
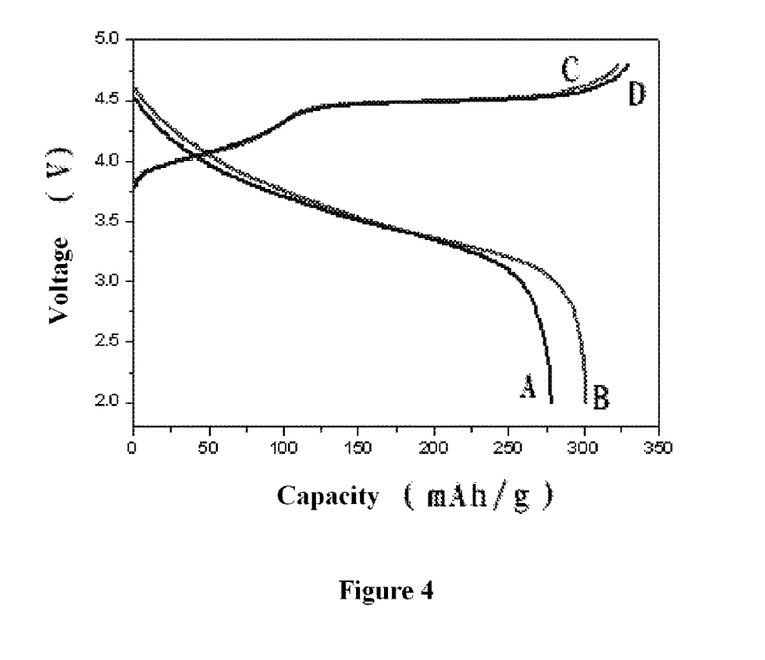
FIG. 4 shows the initial charge-discharge curves of the lithium-ion batteries prepared in Example 1 and Example 15.
Figure 5:
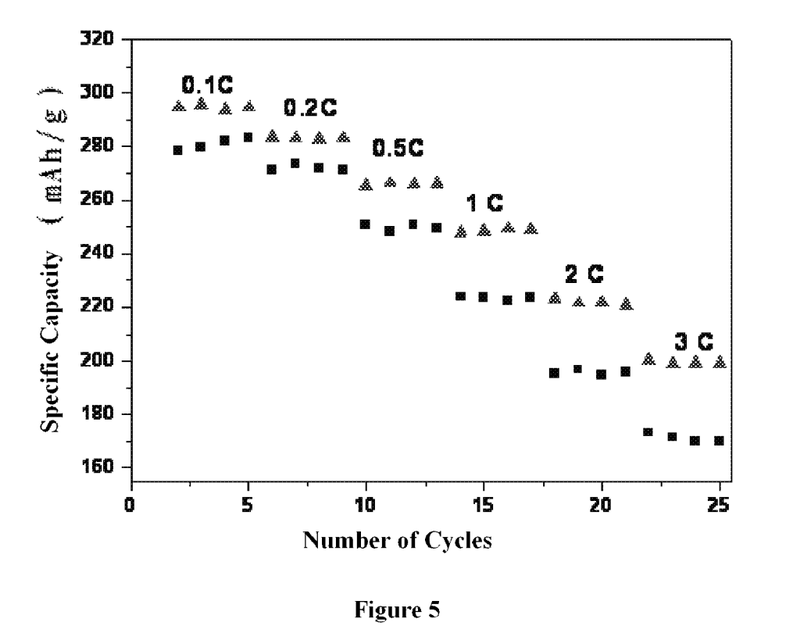
FIG. 5 shows a comparison diagram of the rate performance of the lithium-ion batteries prepared in Example 1 and Example 15.

Lithium-ion batteries using the lithium-rich manganese-based positive electrode materials prepared in Example 15 and Example 1 as the positive electrode materials for the lithium-ion batteries were tested for performances, as shown in FIG. 4 and FIG. 5. FIG. 4 is the initial charge-discharge curves of the lithium-ion batteries prepared in Example 1 and Example 15, in which curve A is the initial discharge curve of the lithium-ion battery prepared in Example 1, curve B is the initial discharge curve of the lithium-ion battery prepared in Example 15, curve C is the initial charge curve of the lithium-ion battery prepared in Example 15, and curve D is the initial charge curve of the lithium-ion battery prepared in Example 1. FIG. 5 is a comparison diagram of rate performance of the lithium-ion batteries prepared in Example 1 and Example 15, wherein region ▲ is the specific capacity of the lithium-ion battery prepared in Example 15, and region ■ is the specific capacity of the lithium-ion battery prepared in Example 15.

The description of the above examples is only for helping to understand the methods of the invention and core concept thereof. It should be noted that for those of ordinary skill in the art, several improvements and modifications may be made to the invention without departing from principles of the invention, and these improvements and modifications shall also fall within the protection scope of the claims of the invention.

The above description of the disclosed examples enables those skilled in the art to implement or utilize the invention. Various modifications to these examples are obvious for those skilled in the art, and the general principles defined herein may be embodied in other examples without departing from the spirit or scope of the invention. Therefore, the invention is not limited to these examples illustrated herein, but corresponds to the broadest scope in consistent with the principles and novel features disclosed herein.

The invention claimed is:

1. A preparation method for a lithium-rich manganese-based positive electrode material, comprising the following steps of:

mixing a lithium-rich manganese-based compound represented by formula (II) with a lithium remover, and carrying out a lithium-removal reaction to obtain the lithium-rich manganese-based positive electrode material represented by formula (I) after the reaction;

$$(x-y)Li_2MnO_3 \cdot yMnO_2 \cdot (1-x)Li(M_aM'_b)O_2 \qquad (I);$$

$$xLi_2MnO_3 \cdot (1-x)Li(M_aM'_b)O_2 \qquad (II);$$

wherein M is one or more selected from the group consisting of nickel, cobalt, manganese, iron, boron, aluminum and vanadium;

M' is one or more selected from the group consisting of titanium, chromium, copper, zinc, zirconium, niobium and molybdenum;

$0 < x \leq 0.8$;

$0.01 \leq y \leq 0.2$;

$a + b = 1$; and $0 \leq b \leq 0.5$;

wherein the lithium remover is a gas lithium remover or a solid lithium remover, the gas lithium remover is an alkaline gas which is selected from the group consisting of ammonia, hydrogen phosphide and hydrazine, and the solid lithium remover is one or more selected from the group consisting of ammonium chloride, ammonium sulphite, ammonium carbonate, ammonium bicarbonate, ammonium acetate, ammonium oxalate, ammonium phosphide and urea.

2. The preparation method according to claim 1, wherein the lithium-removal reaction is a solid-phase lithium-removal reaction or a liquid-phase lithium-removal reaction.

3. The preparation method according to claim 2, wherein the solid-phase lithium-removal reaction involves mixing a solid lithium remover with the lithium-rich manganese-based compound uniformly in a molar ratio of 1:100 to 1:2, and carrying out a reaction at 40 to 1000° C. for 2 to 30 h.

4. The preparation method according to claim 2, wherein the solid-phase lithium-removal reaction involves introducing a mixed gas of a gas lithium remover and an inert gas in a molar ratio of 1:100 to 1:2 into the lithium-rich manganese-based compound, and carrying out a reaction at 40 to 1000° C. for 2 to 30 h.

5. The preparation method according to claim 2, wherein the liquid-phase lithium-removal reaction involves mixing the lithium-rich manganese-based compound and a solid lithium remover with water, and carrying out a reaction at 60 to 300° C. for 2 to 30 h, and wherein the molar ratio of the lithium-rich manganese-based compound to the solid lithium remover is 1:100 to 1:2.

6. The preparation method according to claim 1, wherein after the reaction is complete, products are treated by mixing the products after the reaction with a liquid phase extractant and carrying out a heat treatment after filtration.

* * * * *